United States Patent [19]
Hoffman

[11] Patent Number: 5,898,246
[45] Date of Patent: Apr. 27, 1999

[54] CONTROL OF RELUCTANCE DYNAMOELECTRIC MACHINE COOLING FLUID

[75] Inventor: Eugene P. Hoffman, Beavercreek, Ohio

[73] Assignee: The United States of America as represented by the Secretary of the Air Force, Washington, D.C.

[21] Appl. No.: 09/040,247

[22] Filed: Mar. 13, 1998

[51] Int. Cl.[6] ............................. H02K 9/04; H02K 19/00
[52] U.S. Cl. ........................ 310/60 R; 310/52; 310/58; 310/89; 310/168; 310/162
[58] Field of Search ................................. 310/52, 58, 59, 310/60 R, 62, 63, 89, 162, 168

[56] References Cited

U.S. PATENT DOCUMENTS

| | | | |
|---|---|---|---|
| 3,529,189 | 9/1970 | Armstrong | 310/59 |
| 3,610,976 | 10/1971 | Wightman | 310/60 |
| 3,629,629 | 12/1971 | Liebe et al. | 310/59 |
| 3,715,610 | 2/1973 | Brinkman | 310/54 |
| 3,725,706 | 4/1973 | Lukens | 310/62 |
| 3,761,748 | 9/1973 | Baumann et al. | 310/58 |
| 4,028,569 | 6/1977 | Towne | 310/64 |
| 4,134,317 | 1/1979 | Goel et al. | 83/35 |
| 4,163,163 | 7/1979 | Gurevich | 310/59 |
| 4,182,966 | 1/1980 | Mishra et al. | 310/59 |
| 4,233,533 | 11/1980 | Lown | 310/59 |
| 4,383,191 | 5/1983 | Mizuyama et al. | 310/59 |
| 4,409,502 | 10/1983 | McCabria | 310/61 |
| 4,467,229 | 8/1984 | Ogita | 310/60 A |
| 4,496,863 | 1/1985 | Sawatani | 310/61 |
| 4,766,337 | 8/1988 | Parkinson et al. | 310/58 |
| 4,859,887 | 8/1989 | Carlsson et al. | 310/59 |
| 5,001,378 | 3/1991 | Miller et al. | 310/178 |
| 5,241,230 | 8/1993 | Tanaka et al. | 310/62 |
| 5,559,386 | 9/1996 | Gurrieri | 310/211 |

*Primary Examiner*—Nestor Ramirez
*Assistant Examiner*—B. Mullins
*Attorney, Agent, or Firm*—Gerald B. Hollins; Thomas L. Kundert

[57] ABSTRACT

A cooling arrangement for a high speed open rotor reluctance motor/generator apparatus of the type finding combination use in aircraft applications for engine starting and electrical energy generation in both normal and auxiliary power unit operating conditions. The cooling arrangement identifies fluid flow alternatives which include inlet region redirection of coolant fluid to improve its induction into rotor interpolar space, rotor movement-induced centrifugal pressurizing of coolant using simple and more complex structural elements, machine heating of the coolant fluid, kinetic energy extraction from heated moving coolant fluid and combinations of these arrangements in particular machine configurations. Use of the invention under extremes of machine energy levels and self heating in military and commercial aircraft environments are contemplated.

19 Claims, 3 Drawing Sheets

CONTROL OF RELUCTANCE DYNAMOELECTRIC MACHINE COOLING FLUID

RIGHTS OF THE GOVERNMENT

The invention described herein may be manufactured and used by or for the Government of the United States for all governmental purposes without the payment of any royalty.

BACKGROUND OF THE INVENTION

This invention concerns the field of cooling a rotating electrical machine particularly a high speed reluctance machine that is free of rotor windings.

The switched-reluctance electro machine, i.e., the reluctance generator/motor, is presently considered desirable for use as a direct-drive energy transducer for coupling the rotatable shaft of a turbine engine to either an electrical load or to an electrical energy source. A significant example of this usage appears in the relatively small and lightweight apparatus providing modern aircraft with stand-alone ground electrical energy and air conditioning, for examples, and with in-flight engine restart capability. In such equipment a switched reluctance generator/motor may be used to both generate electrical energy and provide auxiliary power unit turbine engine starting torque and main engine starting torque.

Use of such an electrical to mechanical transducer in a larger size as both the starting motor and the electrical generator coupled to the propulsion engine of an aircraft is also possible. The switching used in such machines is preferably accomplished with electronic devices such as transistors operated in synchronism with positioning of the machine rotor. Generally a given machine is considered to provide motor action when its rotor to stator pole gap is decreasing under the influence of winding current flow and generator action when pole overlap is increasing. The electrical switching is used to exclude or minimize an unwanted of these two effects in a particular use application with switching events occurring as fast as each 250 nanoseconds. When combined with switching circuitry, the reluctance motor/generator is often referred-to using the name "switched reluctance motor/generator" or "variable reluctance machine". Switching excitation is of course appropriate when the machine is used as a motor and is also used in connection with the machine functioning as a generator. According to refinements of such switching it can also be used to preclude pole tip saturation and related heating effects in the operation of some reluctance motor/generator machines.

The arrangement of apparatus for stand-alone ground electrical energy generation and air conditioning purposes has evolved toward a relatively high speed hot gas turbine directly coupled to a reluctance generator/motor, without intervening gear couplings and often employing a common integral drive shaft between turbine and reluctance generator/motor. A part of this evolution has involved equipment called the "More Electrical Aircraft Integrated Power Unit", i.e., the MEA IPU, in the United States Air Force. Apparatus of this type is usually operated at a high revolution rate since considerations involving size and weight are as important as operating life, maintenance requirements and operating noise levels in such equipment. A temperature maintenance arrangement for one portion of this apparatus, the reluctance generator/motor portion, is the subject of the present invention.

As noted, the switched reluctance generator/motor is also found desirable for use as a two-way energy transducer in an aircraft propulsion jet engine; i.e., for use during starting of the engine and then for use in converting a portion of the engine's mechanical energy output into the aircraft's electrical energy source. In the United States Air Force, this embodiment of the switched reluctance generator/motor has been given the name of an "Integral Starter/Generator". In this propulsion jet engine application, a somewhat larger and slower-rotating switched reluctance generator/motor than is optimum for the Aircraft Integrated Power Unit application is needed; nevertheless the energy densities involved in this use are also sufficient to make cooling, as in the present invention, an important consideration in the energy transducer's configuration.

In each of these aircraft uses it is desirable to operate a switched reluctance generator/motor at such energy densities and rates of revolution, rates in the forty thousand to seventy thousand revolutions per minute range for example, that energy losses within the machine's enclosure can result in harmful temperature increases in machine components. Notwithstanding common use of cobalt steels and the thinnest (e.g., three mills) laminations practical for example, it is possible for the operating temperature of the rotor in a reluctance motor/generator of such equipment to approach operating temperatures of one thousand degrees Fahrenheit. At this temperature the metallurgical and magnetic properties of the rotor material are often adversely affected. In the winding-free rotor arrangement of a reluctance motor/generator, energy losses causing these temperatures arise not from copper or $I^2R$ sources, but from hysteresis and eddy current losses in the magnetic material and also from windage losses attending the rotor operation at high rates of revolution.

A plurality of cooling arrangements have been employed in previous high performance reluctance motor/generator devices. One such cooling arrangement is shown in the companion patent application of my colleague, Mr. Edward Durkin, U.S. patent application Ser. No. 08/653,035, Filed May 24, 1996, now U.S. Pat. No. 5,703,421, titled RELUCTANCE GENERATOR/MOTOR COOLING. The contents of this Durkin patent are hereby incorporated by reference herein. Some additional previous cooling arrangements for such machines involve the use of flowing liquids traversing one or more parts of the machine, such as within the machine winding conductors (as shown in U.S. Pat. No. 5,489,810 for example) or within the machine magnetic elements (as shown in U.S. Pat. Nos. 5,189,325 and 3,681,628 for example), while others employ the biphase fluid heat exchanger device which is otherwise known as a heat pipe.

Although such cooling arrangements can be effective, it is presently a desire of the U.S. military to exclude liquids (and moreover even lubricant liquids) from the environment of reluctance motor/generator electrical machines used for certain purposes in an aircraft and to rely instead on gaseous fluids, especially air, for machine cooling purposes. Moreover this desire also extends to an avoidance of gearing in the machine's mechanical energy input circuit and thereby includes the elimination of lubricants needed in the machine's mechanical input circuit. The removal of cooling oil for example from use in such machines can be appreciated to offer significant benefits with regard to simplified equipment maintenance procedures, increased battle damage immunity and fire safety when the machine is used in a combat aircraft. The present invention considers one aspect of this electrical machine enhancement effort, the improved control of gaseous coolant fluids in an open rotor or salient pole rotor reluctance electrical machine.

SUMMARY OF THE INVENTION

The present invention provides several cooling fluid flow improvements relevant to the special operating environment of a high speed reluctance motor/generator machine, machines of the type usable in aircraft applications. These improvements are directed to the enhancement of machine operating efficiency through a reduction in incurred windage losses.

It is an object of the present invention therefore, to provide an efficient reluctance motor/generator arrangement of relatively low coolant windage losses.

It is another object of the present invention to provide a dynamoelectric machine in which a desirable balance between windage energy losses and cooling effectiveness is achieved.

It is also an object of the invention to provide a switched reluctance motor/generator arrangement in which effective rotor cooling is achieved in a winding-free rotor.

It is another object of the invention to provide a switched reluctance motor/generator in which coolant pressurization and axial flow are achieved.

It is another object of the invention to provide a switched reluctance motor/generator in which coolant pressurization and axial flow are enabled through the use of radially offset coolant flow paths at opposed rotor ends.

It is another object of the invention to provide a reluctance motor/generator dynamoelectric machine in which kinetic energy is extracted from heated and pressurized expelled coolant fluid in an efficiency improving step.

It is another object of the invention to provide a reluctance motor/generator dynamoelectric machine in which an excess flow of coolant through the heat generating areas of the machine is used in order to maintain desirable element temperatures and in which kinetic energy is extracted from this excess coolant flow just prior to its exit from the machine It is another object of the invention to provide a reluctance motor/generator dynamoelectric machine in which a greater coolant exit velocity arising from coolant temperature increase within the machine is used advantageously to provide a supplementary source of kinetic energy for the machine rotor.

It is another object of the invention to provide a reluctance motor/generator structure in which an array of coolant deflection elements located in rotor inlet regions provide better coolant alignment and reduced coolant windage losses.

It is another object of the invention to provide a reluctance motor/generator structure in which a combination of flow-contoured shapes in rotor and stator coolant inlet regions, kinetic energy extraction from heated and pressurized coolant fluid flow and better coolant to rotor alignment by an array of coolant deflection elements is provided.

Additional objects and features of the invention will be understood from the following description and claims and the accompanying drawings.

These and other objects of the invention are achieved by the method of cooling an electrically switched, rotor winding-free, high speed, reluctance dynamoelectric machine comprising the steps of:

collecting ambient coolant fluid from an environment attending said machine into a moving rotor and fixed stator portions-containing interior of said machine via a fluid flow-contoured first aperture of first rotor radius location in a first shroud member of a first machine end region;

communicating heat energy from said rotor and stator machine portions to said collected ambient coolant fluid during axial movement of said coolant fluid along said rotor and stator portions between said first machine end region and an opposed second machine end region;

venting heated and pressurized coolant fluid from said machine interior back into said environment via a fluid flow-contoured aperture, of second larger average rotor radius dimension location in a second shroud member of said second machine end region;

pressurizing said ambient coolant fluid during said axial movement along said rotor and stator machine portions;

said pressurizing step including imparting rotor kinetic energy and centrifugal force-induced radially outward pumping motion to said cooling fluid between radial locations corresponding with said first average rotor radius of said first shroud member aperture location and said second larger rotor radius of said second shroud member aperture location.

DETAILED DESCRIPTION

Switched reluctance motor/generator dynamoelectric machines are capable of operating at what may be considered to be higher energy densities, densities possible in part because of having no rotor windings and being thereby capable of use at unusually high rates of revolution. The rotor of the reluctance motor/generator illustrated in FIG. 1 of the drawings, for example, in everyday household equipment is comparable in size to that of a five-hundred watt vacuum cleaner or three-hundred watt food mixer motor. In uses contemplated for the present invention apparatus, revolution rates of four to six-thousand per minute as employed in these household uses are replaced with rates of up to one hundred thousand per minute and operation with sixty hertz single phase energy is replaced with higher frequencies and multiple phases. Under such conditions the FIG. 1 machine is capable of operation at energy levels in the two hundred thousand watt or two hundred kilowatt range.

Figure 1:
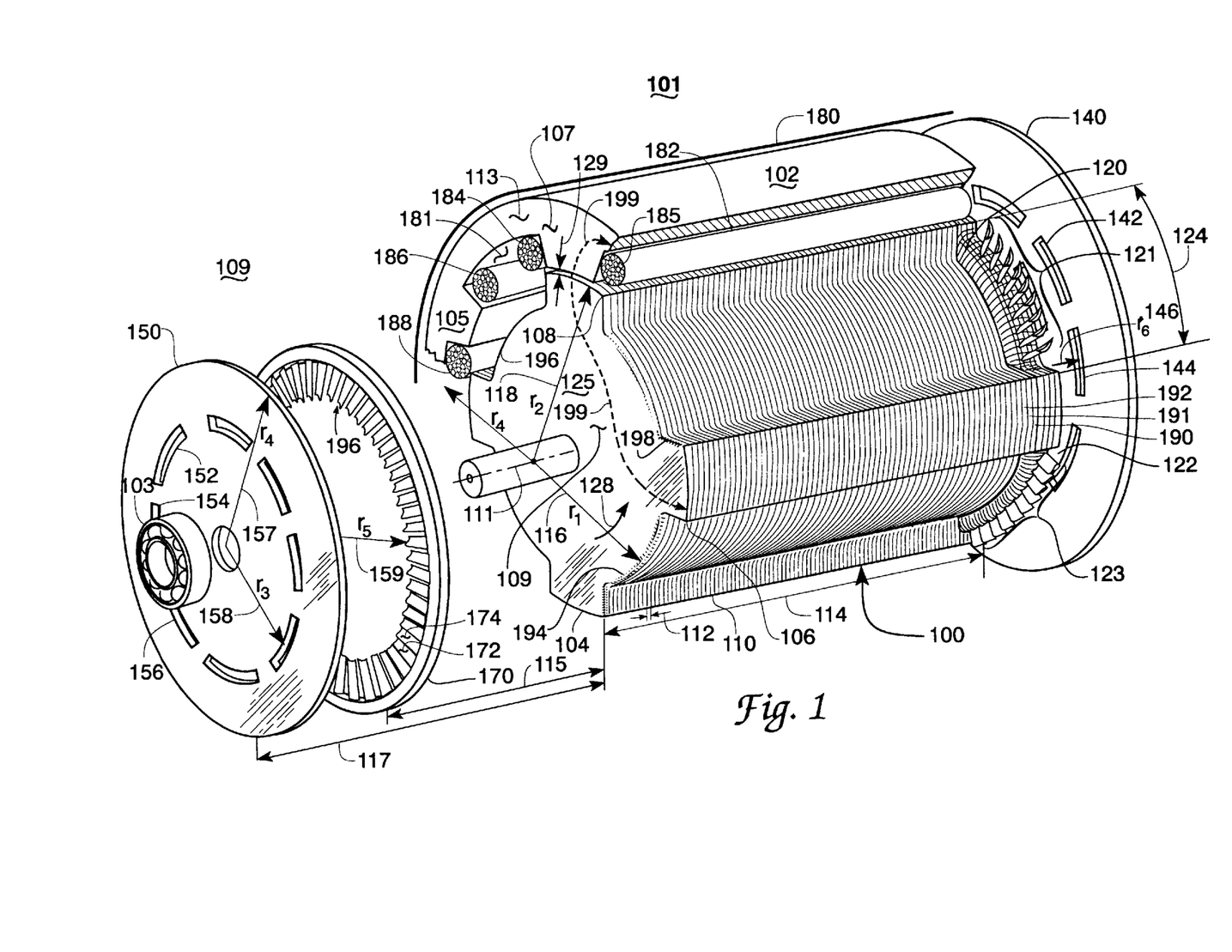
FIG. 1 shows a cutaway overall perspective view of a reluctance motor/generator having a plurality of different cooling arrangements according to the invention.

The FIG. 1 machine 101 is in fact representative of the devices which may be used in an aircraft auxiliary power unit employing a hot gas turbine prime mover, an apparatus capable of generating some one-hundred to two-hundred kilowatts of electrical energy for engine starting and ground use when arranged according to the present invention. Overall rotor dimensions for one auxiliary power unit arrangement of the FIG. 1 machine, a machine of the FIG. 1 represented four pole rotor and six pole stator type, are indicated by the length at 114 and the radius at 118 in the FIG. 1 drawing; in an auxiliary power unit application these dimensions would typically have magnitudes in the range of three to six inches and one half of a three to five inch diameter respectively. Machines of similar type may also be used in the starting and electrical energy generation functions of an aircraft propulsion engine. As an auxiliary power unit starter motor such machines are usually rated for a power level of one-hundred-fifty to three-hundred kilowatts. For propulsion engine starting and electrical energy generation however, a somewhat larger in physical size machine which operates in the slower speed range of fifteen-thousand to twenty-five-thousand revolutions per minute and in the two hundred to four hundred kilowatts electrical range is currently preferred.

When operated at these energy levels, a machine of the FIG. 1 size is subjected to significant electromagnetic losses, primarily from hysteresis and eddy current effects. [During operation at these energy levels and revolution rates it may be appreciated that the presence of electrical windings effects on a rotor of the FIG. 1 type would pose a significant additional thermal loss mechanism, as well as a difficult winding restraint (against centrifugal force) problem; hence a preference for the reluctance dynamoelectric machine in such environments.] Electromagnetic losses alone can therefore result in temperatures beyond the tolerance capability of the magnetic materials and other materials comprising active elements of a reluctance motor/generator machine, temperatures in excess of one thousand degrees Fahrenheit for example. An elevated temperature environment as is associated with a hot gas prime mover is of further difficulty in this temperature environment, particularly when the desired common integral shaft is used for the turbine and the rotor of the energy transducer machine. Parenthetically it is perhaps helpful to explain that the several terms "energy transducer", "dynamoelectric machine", "reluctance motor/generator" and "switched reluctance motor/generator" are used somewhat interchangeably and in various combinations in referring to machines of either motor or generator capability in the present patent document.

The present disclosure is couched primarily in terms of a four pole rotor and six pole stator reluctance machine, a machine which has no rotor windings even of the squirrel cage type and of course no brushes. The freedom from winding encumbrance in the interpole space 124 in FIG. 1, i.e., between salient poles of a reluctance machine rotor, is a significant aspect in selecting this machine for presently described uses. This open interpole space is enabling of the presently disclosed cooling arrangement since axial communication of cooling fluid between end shrouds 150 and 140 of the FIG. 1 machine (and the related members 350 and 340 of the FIG. 3 machine) desirably occurs in the FIG. 1 rotor interpole space 124. A significant portion of the heat transferred between machine elements and cooling fluid also occurs in this rotor interpole region—and somewhat in its adjoining rotor to stator airgap region 129 in the FIG. 1 machine. Conversely it is desired in the present invention cooling arrangement that the rotor cooling fluid be largely separated from the interpole regions of the machine stator, the space at 181 in the FIG. 1 drawing for example, in order that a shunting of coolant around the desired rotor interpole cooling path 124 be avoided. As suggested in the FIG. 1 drawing, the presence of machine windings 182, 184, 186 and 188 in the stator interpole space 181 largely precludes this undesired stator shunting of coolant fluid. The invention is of course not limited to the FIG. 1 illustrated four pole rotor and six pole stator machine configuration and may be employed with other configurations so long as space for accomplishing the desired functions is available in the machine's layout.

Figure 2:
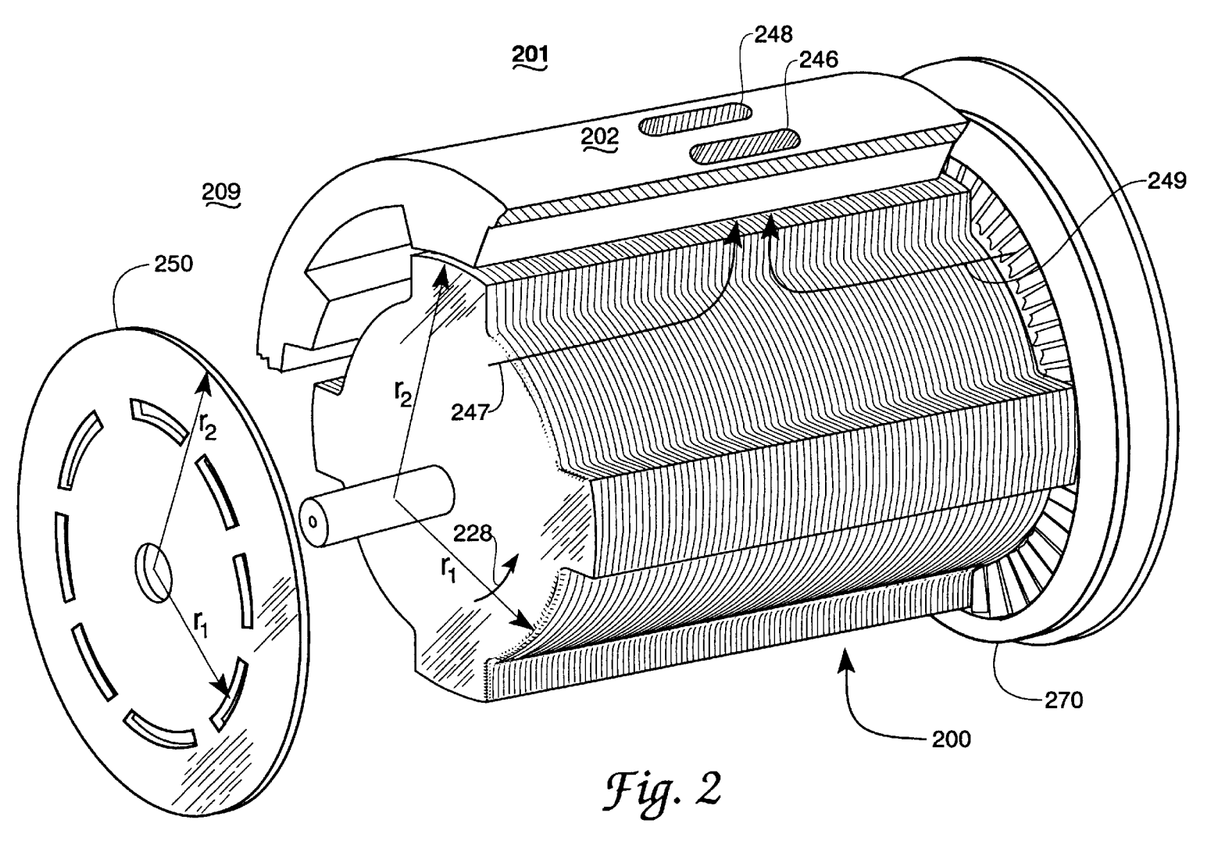
FIG. 2 shows a cutaway overall perspective view of an alternate reluctance motor/generator arrangement according to the invention.

Returning then to the FIG. 1 drawing, at the indicated operating speeds energy losses from windage effects within a dynamoelectric machine can be also be significant— significant from both an efficiency standpoint and for the additional adverse effect such windage losses have on machine operating temperature. The FIG. 2 illustrated rotor when operated at fifty five thousand revolutions per minute in atmospheric pressure with a twenty thousandths of an inch rotor-to-stator air gap at 129 for example, is found to incur a windage loss of some five to seven kilowatts. Such windage losses in fact increase with higher air pressure and the resulting greater air density. Operation at higher revolution rates and with full-load magnetic losses and electrical switching related magnetic losses imposed would of course sharply increase the incurred total losses and thus the energy to be dissipated in order to limit machine temperature rise. Certain of the cooling arrangements identified in the above Background of the Invention section may be helpful in dissipating these energy losses and maintaining safe machine operating temperatures. The present invention however provides a convenient and multi faceted approach to the needed cooling while also limiting the windage-related component of machine losses.

FIG. 1 in the drawings therefore shows a cutaway, perspective, exploded, view of a reluctance motor/generator machine 101 which includes a plurality of enhanced cooling arrangements according to the present invention. In the FIG. 1 drawing there is represented a rotor 100 which includes a plurality of salient poles 104, 106 and 108. The rotor 100 is carried on a bearing 103-supported, axially extending shaft 128 and is comprised of numerous thin laminations 110, laminations which may have a typical thickness of six mills or six thousandths of an inch as is indicated at 112. The laminations 110 are held in fixed relative position to form the rotor 100 by being pressed onto the shaft 128, by keying, by shaft clamps or by welding or other means known in the art, means which are not shown in FIG. 1.

The FIG. 1 reluctance motor/generator also includes a stator member 102 which completely surrounds the rotor 100 and which also has a number of attached or integral salient poles 105 and 107; the stator 102 is shown in a cutaway representation in FIG. 1 in the interest of more clearly showing other motor structure. The stator 102 is preferably also composed of stacked laminations which are not expressly detailed in the FIG. 1 drawing in the interest of simplicity and drawing clarity. Each of the FIG. 1 rotor 100 and stator 102 includes magnetic circuit portions 109 and 113 respectively which interconnect the poles and provide magnetic flux-conducting cross sectional area needed for reluctance motor/generator operation. An airgap 129 separates poles of the rotor 100 and stator 102 in order to provide rotational clearance; this air gap is of some tens of thousandths of an inch in length in an actual reluctance motor/generator but is represented to be of non specific length in FIG. 1 for drawing convenience.

Windings present on the stator 102 are represented by the terminated or sawed-through bundles indicated at 182, 184, 186, and 188 in FIG. 1, the bundles 182–184 representing a single multiple-turned winding set surrounding the stator pole 107. Individual turns of the winding set 182–184 appear in cross sectional representation at 185. The electrical windings of the bundles indicated at 182, 184, 186, and 188 in FIG. 1 are used to communicate electrical energy between an external source or load and the reluctance motor/generator machine. The number of winding turns and the cross-sectional area of each turn in each bundle is of course determinative of the machine voltage, current and impedance operating levels. A portion of these windings may also be devoted to rotor position sensing duty in order to achieve the desired synchronization between electrical switching and rotor position; other sensing arrangements are also known in the art. Windings are usually present at each of the stator poles and may fill all of the stator interpole space of the machine as shown for the windings bundles indicated at 182, 184, 186, and 188 in FIG. 1. Often however, it is not necessary to use the entire interpole space for windings, particularly in the instance of six or fewer stator poles. In such instances there is available sufficient interpole area for the additional winding-area fluid paths discussed below.

Also shown in the FIG. 1 drawing are a series of additional elements associated with the coolant flow of the machine. These elements include the series of turbine blades 121 and 123 disposed within the rotor interpole space 124 on an elevated or increased root diameter portion of the rotor 100 located at the coolant outlet end of the machine. As shown in FIG. 1 the turbine blades 121 and 123 are disposed on or adjacent to the endmost rotor laminations 190, 191 and 192, on laminations which have an increased diameter and generally rounded and air flow-contoured cross sectional shape. Additionally located at the outlet end of the rotor 100 may be an endplate or shroud member 140 in which is disposed, at a location defined by a radius r6 at 146, a series of annular openings 142 and 144 providing an exit path for the heated and pressurized coolant emerging from the FIG. 1 machine.

In place of the interpole turbine rotor blades of FIG. 1 a simple disc attachment to the rotor, an attachment extending about one half the height of the rotor pole can be used when energy recovery does not warrant the FIG. 1 more complex turbine blade approach. Such a rotor configuration is shown in the FIG. 3 drawing. The FIG. 3 simple disc arrangement is considered to be a basic or fundamental arrangement of the present invention, an arrangement which provides effective but perhaps less cooling and no coolant directing or kinetic energy recovery in comparison with the FIG. 1 arrangement. In the FIG. 3 machine coolant flows into the rotor area through the annular slots 356 of small radius r3, 300 and leaves at the larger radius of the disc 340 at the outlet end. The disc 340 has a radius of one half the diameter indicated at 304, a radius greater than that of radius r3, 300 and less than that of the radius r2, 358.

Returning to the arrangement of FIG. 1, at the coolant inlet end 109 of the reluctance motor/generator are located another endplate or shroud member 150 or a bladed ring element 170 which is disposed axially adjacent to the rotor and stator elements 100 and 102 of the machine. The bladed ring element 170 carries an array of annularly disposed and inwardly directed blade vane members represented typically at 172, 174, members which serve to direct coolant entering the annular openings 152, 154, and 156 etc. to a more desirable and less turbulent orientation with respect to a moving rotor element 100 of the FIG. 1 machine. The annularly disposed vane members 172 and 174 of the bladed ring element 170 extend radially inward from the ring element toward the axis of rotation 111 of the FIG. 1 machine to a radius, r5, 159. The radius, r5, 159 is made smaller than the r2 radius in order to capture and redirect most of the coolant entering the annular openings 152, 154, and 156. In the alternate shroud member 150 annular openings 152, 154, and 156 etc. are shown to be centered on a circle of radius r3, 158 which is selected to be near the rotor small radius r1, 116.

In the FIG. 1 exploded view the endplate or shroud element 150 and bladed ring element 170 are shown to be located at one of the axial distances 115 and 117 from the coolant inlet end of rotor 100 and are indicated to be carried by an overall housing 180 which surrounds the reluctance motor/generator machine 101. The axial spacing of these elements in a given embodiment of the invention as well as the similar spacing of the endplate or shroud member 140 at the coolant outlet end of the machine and details of the annularly disposed vane members 172 and 174 can be optimized for a given machine size and rate of revolution according to a tradeoff between windage losses and temperatures attained within worst case locations of the machine—all in a manner that is believed known in the art. Use of the bladed ring element 170 has been found to decrease windage losses at the inlet region 109 of the FIG. 1 machine. The turbine blades 121 and 123 are found to increase the operating efficiency of the machine by extracting kinetic energy from the moving and heated coolant leaving the machine at the apertures of the endplate or shroud member 140. By contouring the annular openings 152, 154, and 156 at the external face of the endplate or shroud member 150 with rounding and other fluid-flow optimized shaping, overall rotor air flow can be increased, with some attendant increase in windage. The movement of coolant leaving the machine arises from both the kinetic energy added by rotor 100 and from the heat-produced larger volume of this coolant at the exit apertures.

Express details of the FIG. 1 machine, details such as the sizes of the rotor 100 and 200, the size and curvature of the vanes or blades 121, 123, 172, 174 and each of the radii 116, 118, 146, 157 and 158 may be tailored for specific machines and their operating conditions. In the course of such tailoring however it is desirable that an underlying principle of the coolant inlet apertures 152, 154 and 156 being disposed at smaller radial distances from the axis of rotation 111 than that of the coolant outlet apertures 142, 144 etc. be maintained in order to achieve the centrifugally energized pumping action or pressurization of the coolant fluid within the rotor interpole space 124.

According to one aspect of the invention the rotation of rotor 100 is assisted by the generally axially flowing coolant in the rotor interpole region 124 acting on the turbine blades 121 and 123 to add rotational torque to the rotor before coolant exiting from the annular apertures of the endplate or shroud member 140. It is interesting to note that this deflection of the axially flowing coolant adjacent the endplate or shroud member 140 also has a desirable effect of slowing the rotational motion component of coolant movement before its entry into the annular openings of the endplate or shroud member 140 and thereby also decrease turbulence and windage losses incurred by the FIG. 1 machine.

As is suggested by the curvatures shown for the turbine blades 121 and 123 and the vane members 172 and 174 it is contemplated that the FIG. 1 machine will rotate in the counter clockwise direction when viewed from the coolant inlet end 109; such rotation is indicated by the arrow 128 at the coolant inlet end of the rotor 100. In this direction of rotation the coolant inlet vanes of the bladed ring element 170 cause the axially flowing coolant to be directed tangential to the face 125 of the rotor 100 so that decreased turbulence and decreased windage losses are incurred.

In a related manner a notable secondary effect of the bladed ring element 170 when used in the FIG. 1 machine is to limit the reluctance motor/generator using such devices to a single direction of rotation for at least full load uses. Rotation in the wrong direction for effective use of the bladed ring element 170 elements is of course possible if for a brief portion of an overall duty cycle or if accomplished under light machine load conditions where maximum coolant effectiveness is not required. A moveable vane arrangement as known in the art for the annularly disposed vane members 172 and 174 can of course be used to overcome this direction of rotation favoritism in the FIG. 1 machine with the addition of some mechanical complexity. Similarly a direction of rotation-neutral contouring of the vane members 172 and 174 may be used to accommodate a bidirectional machine—with some penalty in the domain of coolant flow efficiency.

Another aspect of the FIG. 1 reluctance motor/generator machine which appears in the FIG. 1 drawing is concerned with the rounding of certain coolant windage-loss influencing edges, particularly in the moving portions of the machine. Such rounded edges are preferably provided at the intersection of the rotor face 125 and the rotor interpole region 124 as is indicated at 194 and 196 in FIG. 1. Such rounding is also desirably provided at the leading edge of each salient rotor pole of the FIG. 1 machine, as is most clearly indicated at 198 for the rotor pole 106. Edge rounding usually has the effect of allowing more flow and increased windage in a manner analogous to smooth contouring for the inlet to a pipe (i.e. CD or entry coefficient greater than 0.6). This is desirable for increased cooling effect and undesirable for increased windage losses in the FIG. 1 machine. Clearly a selected tradeoff is appropriate.

The term "coolant" has been used in connection with this description of the FIG. 1 machine in consideration of the fact that a variety of heat removing "fluids", preferably in the form of gaseous fluids, may be employed with such machines. Although ambient air is the preferred of these gaseous fluids for military uses, other gases such as nitrogen or hydrogen may be used when the FIG. 1 machine is surrounded by a gas tight enclosure and provided with a heat exchanger to cool the then enclosed fluid. For military aircraft related uses of the FIG. 1 machine, it is preferred that ambient air, in whatever condition of density, temperature and moisture content is available from the environment surrounding an aircraft be employed as the ultimate coolant media. Such air may be either directly introduced through the bladed ring element 170 or the apertures of the endplate or shroud member 150 into the machine as is preferred, or alternately may be used in conjunction with a heat exchanger mounted internally or externally of the FIG. 1 machine in the instance of a closed machine. In the interest of clarification, the coolant for either a directly cooled or a closed machine is herein generically referred-to as coolant "attending" the machine.

Figure 3:
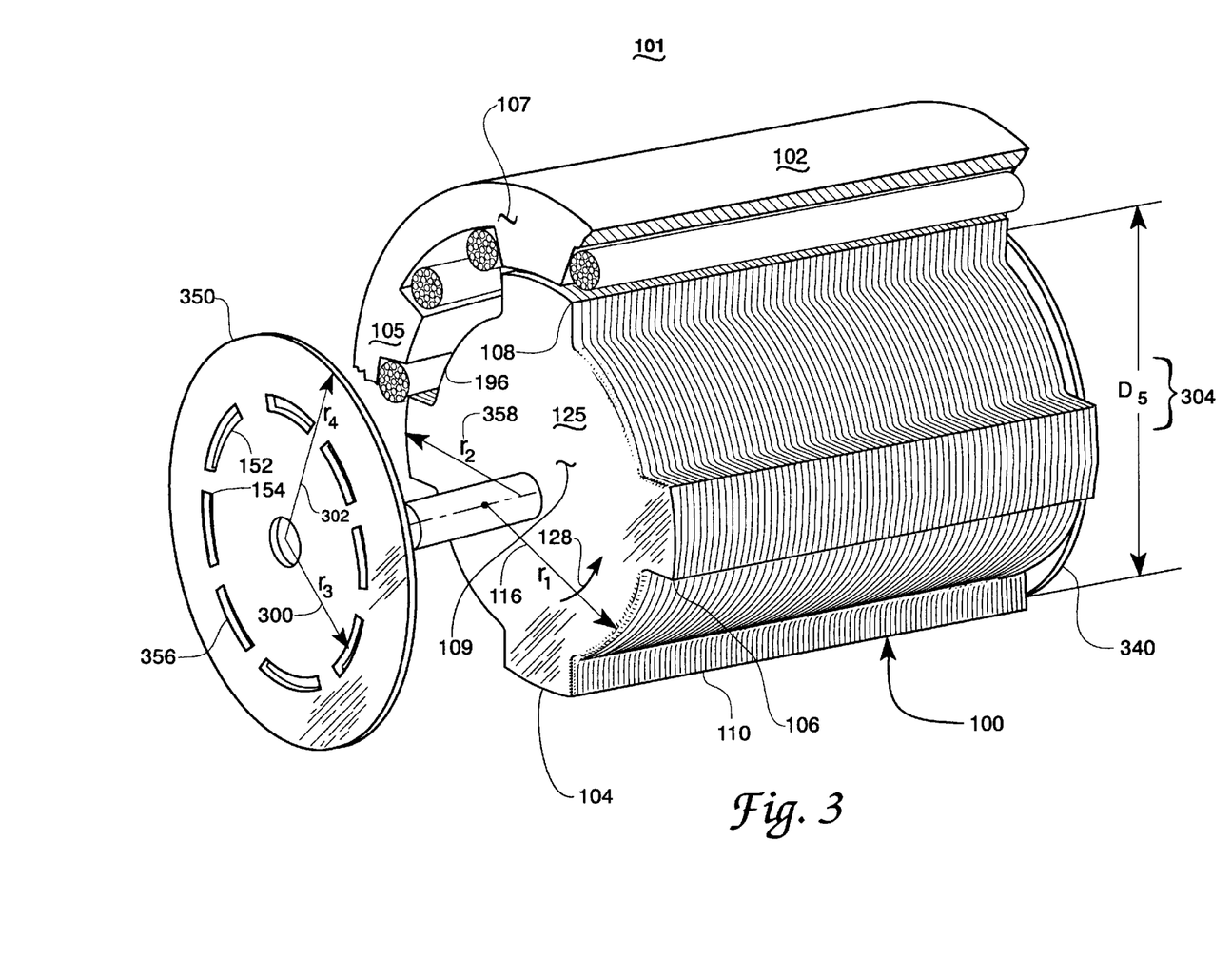
FIG. 3 shows a basic reluctance motor/generator cooling arrangement according to the invention.

A switched reluctance motor/generator of the FIG. 1, FIG. 2 and FIG. 3 types, as indicated above, is considered to provide motor action when its rotor to stator pole gap is decreasing under the influence of rotor or stator winding current flow and generator action when this pole gap is increasing. Synchronized electrical switching is used to exclude or minimize an unwanted of these two effects in a particular use situation. One magnetic circuit used during a particular rotor and stator pole positioning, and switching phase, for operation of the FIG. 1 machine, i.e., a magnetic circuit involving the rotor interpole region path 109, is indicated at 199 in FIG. 1. The switching used in such machines is preferably accomplished with electronic devices such as transistors or other semiconductor switching devices which are operated in synchronism with positioning of the machine rotor by way of magnetic or optical rotor position sensing arrangements which are known in the art.

As is also known in the art, the FIG. 1, FIG. 2 and FIG. 3 machines accomplish their energy transfer or energy transducer function by way of changing magnetic reluctance in this typical FIG. 1 magnetic circuit 199. This change results from increasing or decreasing rotor-to-stator pole alignment, and a resulting change in magnetic flux quantity existing in the magnetic circuit 199. In time sequence these alignment changes also occur in the similar other magnetic circuits of the machine. A tendency to maximize this flux and minimize the reluctance of the magnetic circuit 199 for example accompanies a physical attraction between rotor and stator poles of the machine and thereby causes its motor action; a change of flux quantity in the magnetic circuit 199 induces electromotive force or voltage into the windings 182, 184, 186, and 188 in FIG. 1 and thereby achieves generator action. It is of course the rapid and large quantity variations of flux in elements of the magnetic circuit 199 which also provides one of the primary sources of energy loss and heating of the FIG. 1 machine elements-in either its generator or motor operating mode. Such flux changes lead to hysteresis and eddy current electromagnetic effects which are of an energy dissipating nature and are accommodated by the present invention.

In instances wherein unidirectional axial coolant flow over the full length of the machine is undesirable for temperature control or other reasons, certain changes in the FIG. 1 coolant flow arrangement are possible in embodying the invention; these changes are indicated in the FIG. 2 drawing. In the FIG. 2 drawing, identification numbers corresponding to those of the last digits of the numbers in the FIG. 1 drawing are used—with a change of the first digit from a 100 series number to a 200 series number to indicate a relationship with FIG. 2 and also with addition of new 200 series three digit numbers as needed. The primary differences between the FIG. 1 and FIG. 2 machines lies in use of a FIG. 1 type of coolant inlet structure, e.g., the shroud member 150 in FIG. 1, 250 in FIG. 2, at each end of the machine and use of axial center-located coolant outlet ports from the machine. As shown in the FIG. 2 reluctance motor/generator therefore the machine 201 is provided with coolant inlet from both the right hand and left hand ends and each of these coolant inlets may also be provided with a bladed ring element 270 in order to minimize coolant turbulence losses at the end faces of the rotor 200.

In lieu of the left hand entrance and right hand exit of coolant in the FIG. 1 machine the FIG. 2 machine is provided with an array of radially directed ports of the type indicated at 246 through the center of a pole structure. In instances wherein the stator interpole space is not totally filled with machine windings the FIG. 2 machine may also be provided with related coolant escape ports of the type indicated at 248. Each of the port types indicated at 246 and 248 is of course merely representative of a series of such ports which are distributed circumferentially around the stator of the FIG. 2 machine. These ports also extend through the not shown overall housing 180 of the FIG. 2 machine. Winding-located stator cooling fluid escape apertures as shown at 248 are also advantageous in instances wherein radial coolant flow is desired but the full stator pole cross sectional area is needed for magnetic flux conduction purposes.

With the dual endwise inlet and axial center outlet of coolant fluid as shown in the FIG. 2 machine, the rotor interpole region coolant flow paths are generally as indicated at 247 and 249 in the FIG. 2 drawing. As may be appreciated from the FIG. 2 drawing these flows are more effective in maintaining uniform machine temperature and tend to shift the location of any heated coolant hot spots in rotor, stator and winding elements from the coolant outlet end to the axial center of the machine. In the case of rotor and stator structural or magnetic elements this shift is of some advantage since the available heat transfer cross sectional area in these elements is large enough to conduct heat away from any such hot spot and thereby tend to maintain a uniform rotor or stator temperature. The relatively large mating surface areas of adjacent stator laminations and adjacent rotor laminations and the relatively good thermal conductivity properties of even the steel and cobalt alloys used in these laminations of course minimizes any hot center temperature profile effect, and tends to keep axially segregated portions of the machine at the same temperature.

In the case of stator windings however, a centermost hot spot tendency is of some concern since winding bundles are usually less temperature tolerant and tend inherently to incur failure from center-most hot spots. With a sufficient flow of cooling fluid so as to have relatively cool exit fluid available at the winding located coolant exit aperture 248 however the FIG. 2 arrangement can be helpful in controlling this winding hot spot temperature. It is of course possible to distribute a number of apertures of the type shown at 246 and 248 along the axial length of the FIG. 2 machine in order to better limit both magnetic elements and windings to a uniform temperature. The coolant pumping action referred-to in connection with the FIG. 1 machine continues to exist to some degree in the FIG. 2 machine since the underlying concept of fluid inlet at a small radius and outlet at a larger radius remains present.

As an example of the quantitative benefits achievable with the improvements disclosed herein, the above recited five to seven kilowatts of windage loss for a fifty-five thousand revolutions per minute machine may be considered. Closing off the rotor ends in a reluctance motor/generator using an array of non-rotating "shrouds" has been demonstrated to reduce overall windage loss by 50% for a 4-pole rotor of, for example, the FIG. 1, FIG. 2 and FIG. 3 configuration. Adding a rotating circular disc as at 340 in FIG. 3 accomplishes a similar shrouding effect without adding a large loss mechanism of its own so that a loss reduction in the 3 to 4 kilowatt range is possible in the parameters of this example.

In summation therefore, a switched reluctance motor/generator machine, a machine often operating at speeds of 30 to 60 thousand revolutions per minute, can incur losses from magnetic effects and from windage drag which give rise to temperature increases capable of reducing the operating function and life of the machine. With use of the herein disclosed coolant flow improvements these temperatures can be controlled with a reasonable expenditure of coolant related energy losses.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. The method of cooling an electrically switched, rotor winding-free, high speed, reluctance dynamoelectric machine comprising the steps of:
   collecting ambient coolant fluid from an environment attending said machine into a moving rotor and fixed stator portions-containing interior of said machine via a fluid flow-contoured first aperture of first rotor radius location in a first shroud member of a first machine end region;
   communicating heat energy from said rotor and stator machine portions to said collected ambient coolant fluid during axial movement of said coolant fluid along said rotor and stator portions between said first machine end region and an opposed second machine end region;
   venting heated and pressurized coolant fluid from said machine interior back into said environment via a fluid flow-contoured aperture of second larger average rotor radius dimension location in a second shroud member of said second machine end region;
   pressurizing said ambient coolant fluid during said axial movement along said rotor and stator machine portions;
   said pressurizing step including imparting rotor kinetic energy and centrifugal force-induced radially outward pumping motion to said cooling fluid between radial locations corresponding with said first average rotor radius of said first shroud member aperture location and said second larger rotor radius of said second shroud member aperture location.

2. The method of cooling an electrically switched, rotor winding-free, high speed reluctance dynamoelectric machine of claim 1 further comprising the steps of:
   extracting kinetic energy from said pressurized and heated cooling fluid prior to said step of venting heated and pressurized coolant fluid from said machine interior back into said environment; and
   enhancing operating efficiency of said dynamoelectric machine by communicating said extracted coolant fluid kinetic energy back into said machine moving rotor portion.

3. The method of cooling an electrically switched, rotor winding-free, high speed reluctance dynamoelectric machine of claim 2 further comprising the step of:
   reducing coolant fluid losses and additionally enhancing operating efficiency in said machine by turning said collected ambient coolant fluid from an axial movement aperture traversing direction toward a direction tangential to an end face of said rotor upon passage through said first aperture of first average radius dimension location and prior to entry into interpolar spaces of said rotor.

4. The method of cooling an electrically switched, rotor winding-free, high speed reluctance dynamoelectric machine of claim 2 wherein said environment attending said machine is a closed environment physically isolated from ambient air surrounding said machine.

5. The method of cooling an electrically switched, rotor winding-free, high speed reluctance dynamoelectric machine of claim 2 wherein said environment attending said machine is an open environment physically intermixed with ambient air surrounding said machine.

6. The method of cooling an electrically switched, rotor winding-free, high speed reluctance dynamoelectric machine of claim 2 wherein said step of communicating heat energy from said rotor and stator machine portions to said collected ambient coolant fluid includes receiving coolant via a fluid flow-contoured first aperture, of first average rotor radius dimension location in a first shroud member of said first machine end region into said moving rotor and fixed stator portions-containing interior of said machine.

7. The method of cooling an electrically switched, rotor winding-free, high speed reluctance dynamoelectric machine of claim 2 wherein said steps of extracting kinetic energy and enhancing operating efficiency are accomplished by impinging said heated and pressurized coolant fluid on a rotor-connected array of turbine vanes located at said second machine end region.

8. The method of cooling an electrically switched, rotor winding-free, high speed reluctance dynamoelectric machine of claim 2 wherein said step of collecting ambient coolant fluid from an environment attending said machine into a moving rotor and fixed stator portions-containing interior of said machine further includes directing said collected ambient coolant fluid tangentially against an end face portion of said rotor at said first machine end thereof.

9. The method of cooling an electrically switched, rotor winding-free, high speed reluctance dynamoelectric machine of claim 2 wherein said step of communicating heat energy from said rotor and stator machine portions to said collected ambient coolant fluid during axial movement of said coolant fluid along said rotor and stator portions between said first and second machine end regions includes movement of said collected ambient coolant fluid axially through winding-free rotor interpole spaces of said machine.

10. The method of cooling an electrically switched, rotor winding-free, high speed reluctance dynamoelectric machine of claim 2 wherein said step of collecting ambient coolant fluid from an environment attending said machine includes the step of introducing said collected cooling fluid into axially extending rotor interpole regions of said machine through rotor end lamination-comprised apertures of fluid flow-contoured rounded cross sectional shape.

11. Reluctance motor/generator apparatus comprising the combination of:

a motor/generator torque-communicating rotatable shaft member disposed along a rotor axis within a motor/generator stator member;

a salient pole magnetically conductive winding free rotor member extending lengthwise along said torque-communicating rotatable shaft member within said stator member and connecting with said rotatable shaft member in a rotor centrodial region;

said rotor member having a first substantially circular periphery of a first diameter around an outer extremity of said salient poles and a second periphery of a second smaller diameter in annular interpole regions located intermediate root portions of said salient poles;

said rotor member being comprised of a plurality of electromagnetic loss-minimizing thin rotor lamination members held in captive adjacency along said rotatable shaft member;

said motor/generator apparatus including inlet and outlet shroud members disposed at opposed ends of said rotor and traversed respectively by cooling fluid inlet and outlet apertures of smaller rotor axis-centered diameter location in a fluid inlet end shroud member and greater rotor axis centered diameter location in a fluid outlet end shroud member;

said rotor member including a plurality of coolant fluid-engaging energy collection turbine blade members, of said first diameter at an outer extremity thereof, disposed intermediate said rotor salient poles in said rotor annular interpole regions and axially adjacent said cooling fluid outlet aperture of said outlet shroud member;

said motor/generator apparatus also including a plurality of coolant fluid-diverting stationary blade members, of stationary-mounted outer ends and smaller than said first diameter circle-defining innermost ends, disposed axially intermediate a cooling fluid inlet aperture of said rotor member and said coolant fluid inlet aperture traversed shroud member.

12. The reluctance motor/generator apparatus of claim 11 wherein said rotor member coolant fluid-engaging energy collection turbine blade members are disposed in a rotor pole-interrupted annular ring of said first diameter at an outer extremity thereof and of a smaller second diameter at an innermost second extremity thereof and wherein said first and second diameters differ by one half of a rotor pole height dimension.

13. The reluctance motor/generator apparatus of claim 12 wherein said rotor member coolant fluid-engaging energy collection turbine blade members are disposed on rotor interpole annular segments of increased diameter with respect to remaining axially displaced interpole regions of said machine.

14. The reluctance motor/generator apparatus of claim 12 wherein said cooling fluid inlet and outlet apertures include fluid flow turbulence minimizing rounded corner regions on each aperture inlet face thereof.

15. The reluctance motor/generator apparatus of claim 12 wherein said rotor member includes fluid flow turbulence-reducing rounded corner contours located at each rotor end face to rotor annular interpole region junction and at each salient rotor pole end face to leading edge junction.

16. Reluctance motor/generator apparatus comprising the combination of:

a motor/generator torque-communicating rotatable shaft member disposed along a rotor axis in a motor/generator stator member;

a salient pole magnetically conductive winding free rotor member extending lengthwise along said torque-communicating rotatable shaft member within said stator member and connecting with said rotatable shaft member in a rotor centrodial region;

said rotor member having a first substantially circular periphery of a first diameter around an outer extremity of said salient poles and a second periphery of a second smaller diameter in annular interpole regions located intermediate root portions of said salient poles;

said rotor member being comprised of a plurality of electromagnetic loss-minimizing thin rotor lamination members held in captive adjacency along said rotatable shaft member;

said motor/generator apparatus including inlet shroud members disposed at opposed ends thereof and traversed by cooling fluid inlet apertures;

said motor/generator apparatus also including a plurality of coolant fluid-diverting stationary blade members, of stationary-mounted outer ends and smaller than said first diameter circle-defining innermost ends, disposed axially intermediate each cooling fluid inlet aperture at opposed ends of said rotor member and an adjacent end of said rotor member;

said motor/generator apparatus also including a plurality of coolant fluid outlet apertures disposed circumferentially around said stator member along said lengthwise extent of said machine.

17. The reluctance motor/generator apparatus of claim 16 wherein said plurality of coolant fluid outlet apertures disposed circumferentially around said stator member include coolant fluid apertures passing through salient stator pole members of said motor/generator apparatus.

18. The reluctance motor/generator apparatus of claim 16 wherein said plurality of coolant fluid outlet apertures disposed circumferentially around said stator member include coolant fluid apertures passing through stator interpole regions between stator salient pole members of said motor/generator apparatus.

19. The method of cooling an aircraft-disposed, rotor winding-free, thinly laminated, high speed, electrically switched, reluctance dynamoelectric machine comprising the steps of:

collecting ambient coolant fluid from an environment attending said aircraft disposed machine into a winding free moving rotor and fixed stator portions-containing interior of said machine via a first fluid control member of first effective fluid flow radius disposed at a machine end region;

communicating heat energy from said switched machine thinly laminated rotor and stator portions to said collected ambient coolant fluid during axial movement of said coolant fluid along said rotor and stator portions between said machine end region and a fluid outlet aperture;

pressurizing said ambient coolant fluid during said axial movement along said winding free thinly laminated rotor and stator machine portions;

said pressurizing step including heating said fluid from said winding free thinly laminated switched machine hysteresis, eddy current and windage losses and imparting rotor kinetic energy and centrifugal force-induced radially outward pumping motion to said fluid achieving fluid movement between said first and a second machine effective radius dimension;

venting heated and pressurized coolant fluid from said machine interior back into said environment via said fluid outlet aperture, an aperture disposed at said second larger effective machine radius dimension.

* * * * *